United States Patent [19]

Koike et al.

[11] Patent Number: 4,811,322

[45] Date of Patent: Mar. 7, 1989

[54] PHONOGRAPH FOR A RECORD DISK HAVING A PLURALITY OF SOUND GROOVES

[75] Inventors: Eishi Koike, Sagamihara; Kazumi Nozawa, Machida, both of Japan

[73] Assignee: Ozen Corporation, Tokyo, Japan

[21] Appl. No.: 216,667

[22] Filed: Jul. 8, 1988

[30] Foreign Application Priority Data

Jul. 8, 1987 [JP] Japan .................................. 62-170436

[51] Int. Cl.4 .......................... A63H 3/33; G11B 3/00; G11B 19/20
[52] U.S. Cl. .......................................... 369/65; 369/67
[58] Field of Search ........................ 369/63, 65, 66, 67

[56] References Cited

U.S. PATENT DOCUMENTS

| 3,712,629 | 1/1973 | Watanabe | 369/63 |
| 4,482,990 | 11/1984 | Koike | 369/63 |
| 4,694,445 | 9/1987 | Koike | 369/65 |

FOREIGN PATENT DOCUMENTS 2147447 5/1985 United Kingdom ................. 369/63

Primary Examiner—Steven L. Stephan
Attorney, Agent, or Firm—Arnold S. Weintraub

[57] ABSTRACT

An index portion of a record disk unit is formed by cutting out a portion of a flange which is formed continuously along a peripheral edge of the record disk unit. When one of selection rods is pushed against a spring which urges the selection rod in a retreating direction, to rotate a stylus presssure release actuating wheel, an engaging member, formed on the selection rod, is elastically deformed by the edge of the flange and rides over the flange into engagement therewith. When the index portion of the record disk unit comes around to a position coincident with the engaging member, the engaging member is allowed to pass through the cut-out portion of the index portion, to thereby return the selection member to its original position by a spring force to be applied a stylus pressure on a pickup.

2 Claims, 6 Drawing Sheets

PHONOGRAPH FOR A RECORD DISK HAVING A PLURALITY OF SOUND GROOVES

BACKGROUND OF THE INVENTION

1. Field of the Invention:

The present invention relates to a phonograph for a record disk having a plurality of sound grooves, and in particular, to a simplified phonograph comprising selection rods corresponding in number to the number of sound grooves formed in a recording surface of a record disk unit, and a stylus pressure release actuating wheel normally urged in a predetermined direction of rotation for releasing the stylus pressure of a pickup when rotated in the opposite direction to the urged direction, by one of the selecting rods.

2. Description of the Prior Art:

A simplified phonograph capable of selectively reproducing a record disk having a plurality of sound grooves has been developed and known in the art. See, for example, U.S. Pat. No. 3,712,629 (corresponding to Great Britain Pat. No. 1336749, and Japanese Patent Publication No. 51-19763).

In a simplified phonograph, when one of the selection rods is depressed, the selection rod is pressed against a slant surface of the stylus pressure release actuating wheel to rotate same. As the stylus pressure release actuating wheel rotates, a stylus pressure release member, carried on the stylus pressure release actuating wheel, is moved together with the latter, and raises a speaker unit to return the pickup to a reproduction starting point on the recording surface of the record disk. At the same time, the selection rod engages a stopper pin, provided as an index portion no the record disk unit, and tentatively stops the rotation of the record disk unit, to thereby place a specified sound groove at a position at which the pickup, which has returned to the reproduction starting point, can engage. When the pressing pressure of the selection rod is released, the stylus pressure release member moves backwardly, together with the stylus pressure release actuating wheel, to release the support of the speaker unit. Thus, the stylus pressure of the pickup is applied.

In such a structure, if the selection rod is not sufficiently pressed so that the stopper pin engages the depressed selection rod, the stylus pressure will be applied while the pickup is still on its way back to the reproduction starting point. Thus, the selection of an intended sound groove will fail. The timing of the engagement of the stopper pin with the selection rod differs depending on the position of the stopper pin and the position of the selection rod, and this the operator cannot predict. As a result, the drawback is that, in the case of the simplified phonograph, the reliability of the selection and the speed of operation are lacking.

In order to solve such a drawback, a device has been provided as taught in U.S. Pat. No. 4,482,990 (corresponding to Japanese Patent Laid-Open Publication No. 60-50701).

However, this device also involves a disadvantage in that the stylus release mechanism and the index mechanism are complicated, and it is difficult to simplify the device.

Furthermore, another device has been provided to improve the reliability of selection and the speedy operation as taught in U.S. Pat. No. 4,541,085 (corresponding to Japanese Patent Laid-Open Publication No. 60-76001). However, this device is disadvantageous in simplifying the device since the stylus pressure release mechanism and the index mechanism are complicated.

SUMMARY OF THE INVENTION

The present invention was made to solve the above-mentioned problems in the prior art, and it is, therefore, an object of the present invention to provide a phonograph capable of selecting and reproducing a predetermined sound groove without fail.

Another object of the present invention is to provide a phonograph in which the selection and reproduction operation of a sound groove is carried out rapidly.

A still further object of the present invention is to simplify the structure of a phonograph.

In accordance herewith a simplified phonograph comprises: (a) a casing; (b) a record disk unit having a plurality of sound grooves and rotatably supported in the casing so as to be driven by a motor; (c) a speaker unit having a speaker cone and a sound conducting member and being supported on the record disk unit above a recording surface thereof so as to be oscillatable to approach or move away from the recording surface; (d) a stylus pressing spring for urging the sound conducting member of the speaker unit toward the recording surface of the record disk unit; (e) a pickup sandwiched between the sound conducting member and the record disk unit and applied with a stylus pressure by the stylus pressing spring, the pickup being urged normally by a return spring in a direction of a reproduction starting point of the record disk unit and in a direction away from the sound recording surface; (f) a finish switch for interrupting a supply of electric power to the motor when the pickup reaches a reproduction finish point of the record disk unit and for supplying the electric power to the motor when the pickup returns to the reproduction starting point; (g) a stylus pressure release actuating wheel rotatably and coaxially supported with the record disk unit in the casing and constantly urged in a predetermined rotation direction, said stylus pressure release actuating wheel having slant surfaces equal in number to the number of the sound grooves and rotated against the urging force when one of the slant surfaces is pushed; (h) a stylus pressure releasing member formed on the stylus pressure release actuating wheel for raising the record disk unit when the stylus pressure release actuating wheel is rotated against the urging force to release the stylus pressure to thereby allow the pickup to return to reproduction starting point by the return spring; (i) an index portion formed in a periphery of the record disk unit; (j) a plurality of selection rods corresponding in number to the number of the sound grooves for respectively pushing the slant surfaces of the stylus pressure release actuating wheel, so that when the index portion moves to a coincident position in a pushed condition of one of the selection rods, the pickup is applied, with the stylus pressure, at a position at which an introducing portion of a specified one of the sound grooves is engageable with the pickup which has returned to the reproduction starting point; and (h) a plurality of springs for, respectively, constantly, urging the selection rods in a retreating direction toward the outside of the casing.

The index portion, which determines the timing for applying the stylus pressure to the pickup in order to select a sound groove, is formed by cutting out, in an axial direction, a portion of a flange formed continuously around a periphery of the record disk unit. Furthermore, in order to select a content of a record disk to be reproduced, the selection rods, which correspond in number to the number of sound grooves, are, respectively, formed with engaging members. When one of the selection rods is pushed against the associated spring to rotate the stylus pressure release actuating wheel, the engaging member of the selection rod is elastically deformed to ride over the flange and engages the latter. In this condition, when the engaging member coincides with the cut-out of the index portion, the engaging member can pass through, in the axial direction, the cut-out of the index portion by virtue of the size of the engaging member so selected.

Furthermore, when the engaging member coincides with the index portion, the selection rod returns to its original position by the spring, and the stylus pressure is applied to the pickup.

When the selection rod is pushed and advanced to select the reproduction, the stylus pressure release actuating wheel is rotated, since the slant surface formed thereon is pressed by the selection rod, and the stylus pressure releasing member raises the speaker unit, which applies the stylus pressure to the pickup, to thereby release the stylus pressure. Then, the pickup moves away from the reproduction finish point of the record disk unit and returns to the reproduction starting point. At this time, the reproduction finish switch, which has been supported at the reproduction finish point, is released to introduce current to the motor. Accordingly, the record disk unit starts rotation.

In this manner, when the selection rod is advanced to rotate the stylus pressure release actuating wheel, the engaging member formed on the selection rod is elastically deformed and rides over the flange of the record disk unit to engage the flange. Thus, the selection rod is latched and maintained at the advanced position until the index portion of a cut-out shape comes around with the rotation of the record disk unit. By this, the rotated condition of the stylus pressure release actuating wheel, pushed by the selection rod at the slant surface thereof, is maintained. This means that the speaker unit is maintained, at its raised condition, by the stylus pressure release member, and during this period, the stylus pressure is not applied to the pickup. When the cut-out of the index portion of the record disk unit comes around, and the engaging member coincides with the cut-out portion, the engaging member moves axially in the cut-out portion by the force of the spring of the selection rod and returns to the original position which is lower than the flange. Naturally, the selection rod moves backward and returns to the original position, together with the engaging member, and the stylus pressure release actuating wheel returns to the original position by the force of the spring. Thus, the stylus pressure release member, also, returns to its original position to cease the support of the speaker unit, and the stylus pressure is applied to the pickup.

As described above, the timing for applying the stylus pressure to the pickup is determined by the position of the selection rod to which the engaging member is provided. Furthermore, since the position of the selection rod is in a fixed corresponding relationship with the introducing portion of the sound groove, it is possible to make the pickup engage a desired sound groove by a selected rod.

In the present invention, a phonograph is provided in which the selection and reproduction of a desired sound groove is performed without fail, and the manipulation for the selection of the sound groove is rapid. Furthermore, it is possible to simplify the structure of the phonograph.

DESCRIPTION OF THE PREFERRED EMBODIMENT

Figure 1:
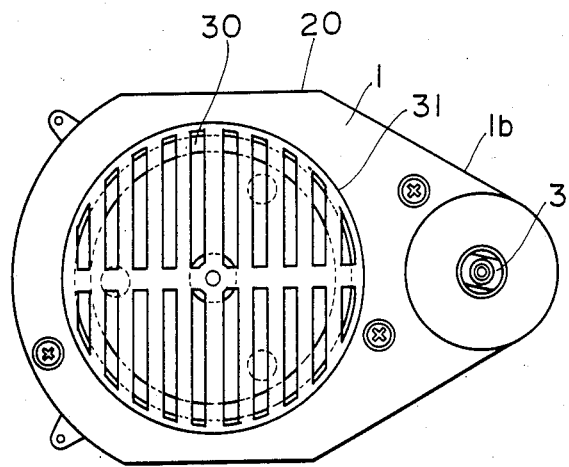
FIG. 1 is a plan view of a phonograph of an embodiment of the present invention.
Figure 2:
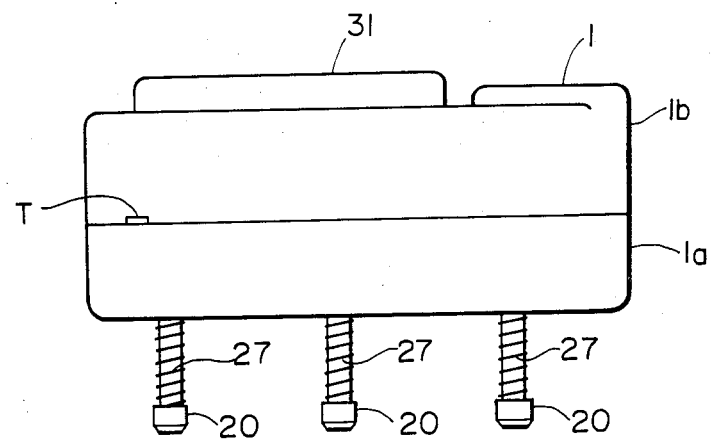
FIG. 2 is a side view of the phonograph of FIG. 1.
Figure 3:
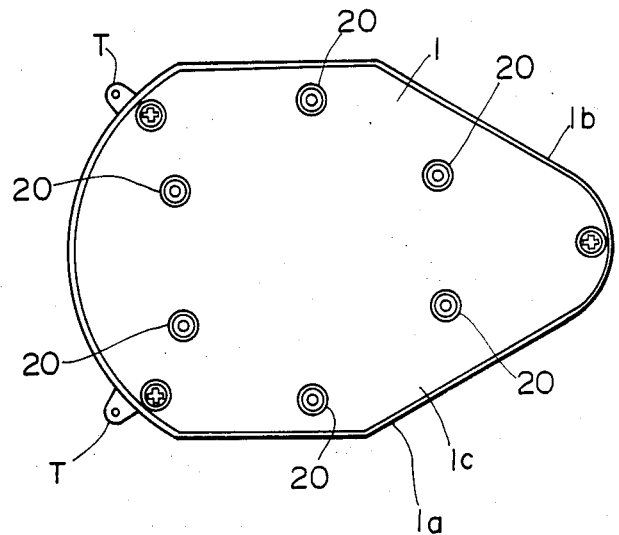
FIG. 3 is an underside view of the phonograph of FIG. 1.

FIGS. 1 to 3 show an appearance of a simplified phonograph of the present invention.

A casing 1 comprises a chassis 1a and a housing 1b which is coupled to the chassis 1a to cover same. In this casing 1, a speaker box 31 having slits 30 for transmitting a reproduced sound therethrough is formed on the upper surface of the housing 1a. Furthermore, a base plate 1c is fitted to the chassis 1a, as shown in FIG. 3, and six selection rods 20 arranged on a circle are held protrudingly outwardly. The selection rods 20 are, respectively, movably mounted in the casing 1 so as to be inserted or drawn out. As shown in FIG. 2, the rods 20 are normally urged by springs 27 in a retreating direction outwardly of the casing 1.

FIGS. 4 to 7 show the inside of the phonograph.

Figure 4:
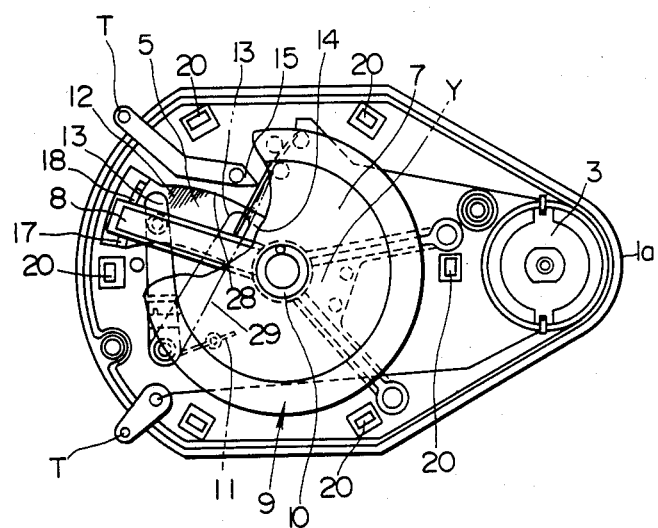
FIG. 4 is a plan view of the phonograph with the housing removed.

FIG. 4 shows members on an upper plate of the chassis 1a with the housing 1b removed from the casing 1. In particular, a tone arm 29 having a pickup 13 at its tip end is pivotally supported at the rear end thereof on the upper plate. A motor 3 is fixed at one end on the upper surface of the upper plate, and as shown in FIG. 5, an output shaft S extends towards the base plate 1c. A speaker unit 9, having a speaker cone 7 and a Y-shaped sound conducting member 8, is supported at tip ends of two-forked arms of the sound conducting member 8, so that the speaker unit 9 is allowed to oscillate to come close to and go away from the upper surface of the upper plate. The rest part of the speaker unit 9 extends so as to be supported on the upper surface of the pickup 13. The speaker unit 9, as shown in FIG. 5, is urged by a stylus pressing spring 10 disposed at the center of a speaker box 31 with the center portion of the speaker cone 7 abutting against the spring 10, so that the pickup 13 is normally depressed downwardly by the speaker unit 9.

As shown in FIG. 4, a finish switch 15 is mounted on the upper plate. When the pickup 13 moves to a position at which the reproduction of recorded sound is finished, the finish switch 15 interrupts the supply of electric power to the motor 3. The finish switch 15 is connected to a terminal T which extends outwardly from the casing 1. An opening 28 for the pickup 13 is formed in the upper plate, and the pickup 13 faces through the lower side of the opening 28 with respect to the upper plate.

Figure 5A:
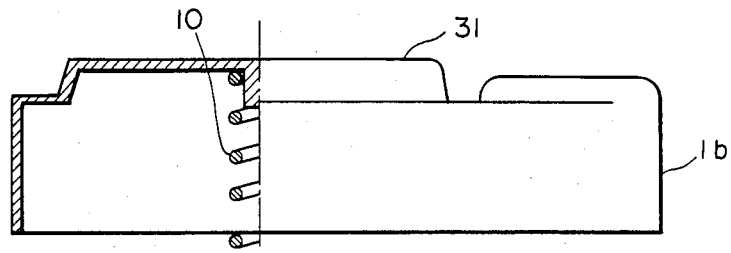
FIGS. 5A, 5B, 5C and 5D are a disassembled view of the phonograph with certain parts thereof removed.
Figure 5B:
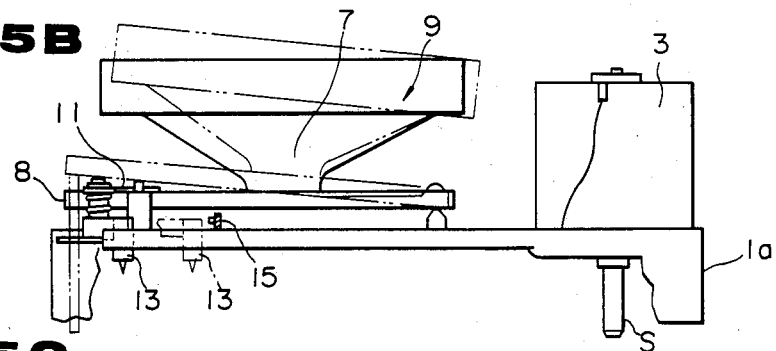
Figure 5C:
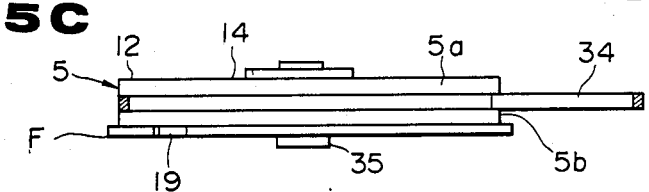
Figure 5D:
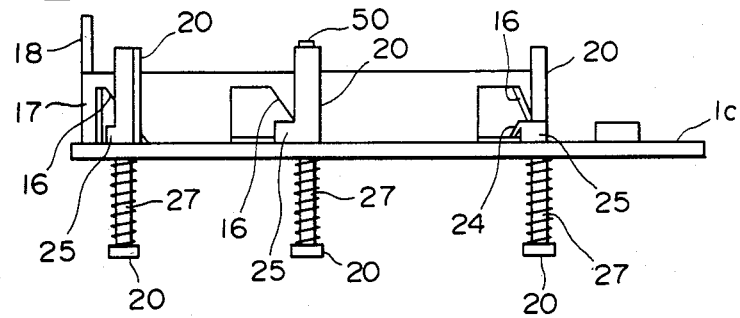
Figure 6:
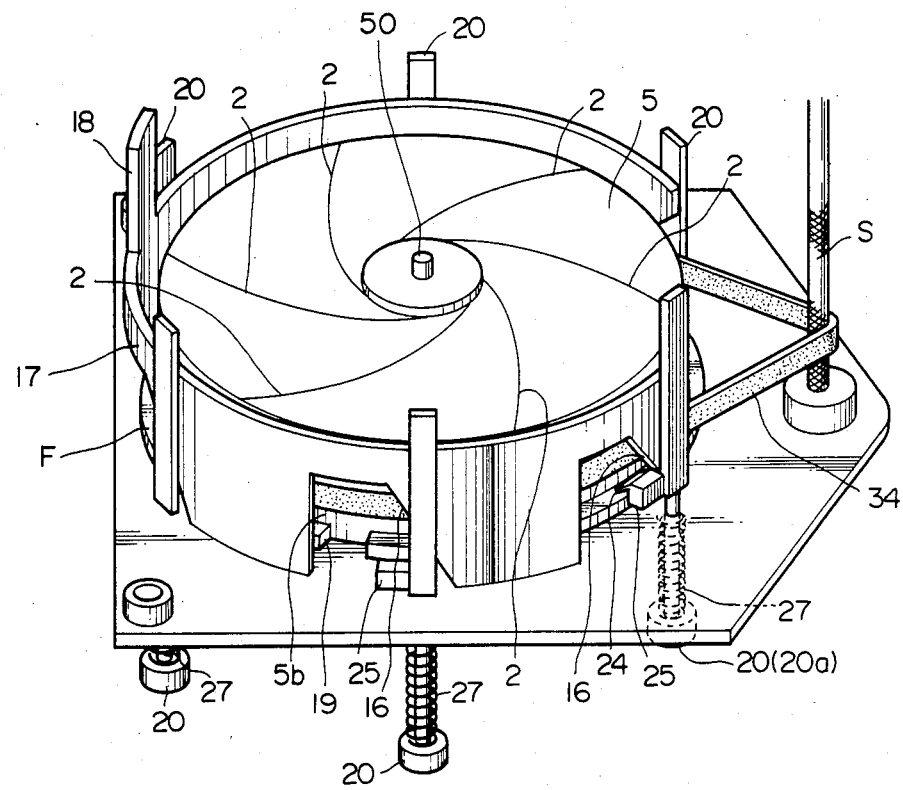
FIG. 6 is a perspective view of the mechanism mounted on a base plate of the phonograph with the housing and chassis removed.

As shown in FIGS. 4 to 6, a record disk unit 5 has six sound grooves 2 on a recording surface thereof. The sound grooves 2 are the same in number as the number of selection rods 20. The pickup 13 is always or constantly urged by a return spring 11 in a direction towards a reproduction starting point 12 on the recording surface of the record disk unit 5 and in a direction away from the sound recorded surface. This return spring 11 is wound about a rear portion of the tone arm 29 at which portion the tone arm 29 is pivotally supported. The finish switch 15 is mounted at a reproduction finish point 14 near the center of the recording surface of the record disk unit 5.

Referring in particular to FIGS. 5A, 5B, 5C, 5D and 6, a center pin 50 is fixed at the center of the base plate 1c, and a stylus pressure release actuating wheel 17 and the record disk unit 5 are rotatably supported by the center pin 50. The stylus pressure release actuating wheel 17 is formed with six slant surfaces facing downwardly and correspond in number to the number of sound grooves 2 of the record disk unit 5, and is formed with a stylus pressure release member 18 extending upwardly and having a scooping slant surface formed at the upper end thereof.

Figure 7:
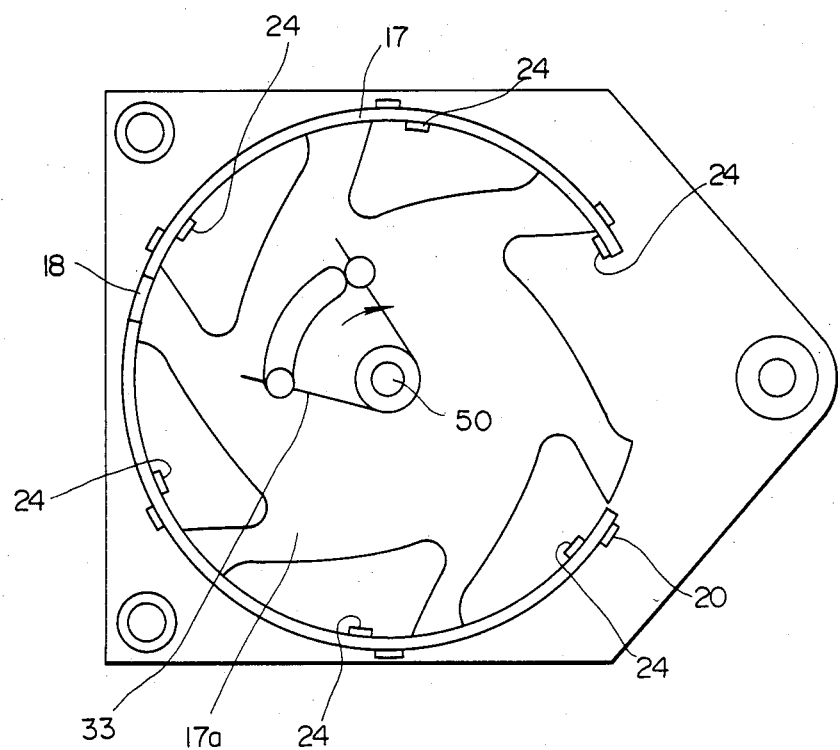
FIG. 7 is a plan view of a stylus pressure release actuating wheel mounted on the base plate of the phonograph.

As shown in particular in FIGS. 6 and 7, one side portion of the stylus pressure release actuating wheel 17 is removed to form an opening which faces the output shaft S of the motor 3.

In FIG. 7, a spoke 17a extends in a plate-shape on the base plate 1c. The spoke 17a mounts the stylus pressure release actuating wheel 17 on the center pin 50 rotatably. A spring 33 urges the stylus pressure release actuating wheel 17 in a predetermined direction, and it is wound about a boss surrounding the center pin 50. One end of the spring 33 engages the stylus pressure release actuatng wheel 17 and the other end engages the base plate 1c. Thus, the stylus pressure release actuating wheel 17 is always urged in the direction of the arrow in FIG. 7.

The stylus pressure release actuating wheel 17 and the record disk unit 5 are disposed below the upper plate. When the housing 1b, record disk unit 5, stylus pressure release actuating wheel 17, chassis 1a, and base plate 1c, shown in FIGS. 5A–5D as disassembled, are assembled, the pickup 13 can engage the recording surface of the record disk unit 5 through the opening 28. At this time, the urging force of the stylus pressure spring 10 to the sound conducting member 8 is applied as a stylus pressure to the pickup 13. Furthermore, the pickup 13 can move between the reproduction starting point 12 and the reproduction finish point on the record disk unit 5 while being sandwiched between the sound conducting member 8 and the record disk unit 5.

Each of the selecting rods 20 has, at an intermediate portion thereof, a pressing portion 25 formed integrally therewith, to oppose the slant surface 16 of the stylus pressure release actuating wheel 17 and to protrude towards the center of the stylus pressure release actuating wheel 17. Furthermore, a downwardly slanted elastic engaging member 24 is formed integrally on a surface of the pressing member 25 facing the center of the stylus pressure release actuating wheel 17.

The stylus pressure release member 18 is located near the sound conducting member 8 so that the slant surface at the tip end of the sound conducting member 8 can scoop the sound conducting member 8.

The record disk unit 5 is assembled in a condition in which a recording surface member 5a is superposed on the turn table member 5b. A continuous flange F is formed on the lower side of the turn table member 5b to circumferentially extend therearound. A portion of the continuous flange F is cut out axially to form an index portion 19. A boss 35 is provided at the axis portion on the lower surface of the turn table member 5b, so that the turn table member 5b is supported on the base plate 1c with a certain height above the base plate 1c.

The pressing portion 25 and the engaging member 24 of each of the selection rods 20 are, in the assembled condition as shown in FIG. 5D, as will be seen from FIG. 6, positioned below the flange F of the turn table 5b when the selection rod 20 is not pushed. However, the pressing portion 25 and the engaging member 24 of the selection rod 20, which has been pushed, are positioned above the flange F. In this case, and in particular, when the engaging member 24 moves from below to above the flange F, the engaging member 24 is elastically deformed when it contacts the periphery of the flange F, and after having moved to a position above the flange F, the engaging member 24 engages the upper surface of the flange F.

A width of the engaging member 24 is made smaller than a width of the cut-out of the index portion 19. Thus, when the engaging member 24 coincides with the index portion 19, the engaging member 24 can pass through the index portion in the axial direction, that is, downwardly.

As shown in FIG. 5C, the peripheral edge surface of the turn table member 5b of the record disk unit 5 is formed as a grooved pulley. An elastic belt 34 engages the pulley.

As shown in FIG. 6, the belt 34 extends and passes through the opening of the stylus pressure release actuating wheel 17 and is coupled to the output shaft S of the motor 3.

Figure 8A:
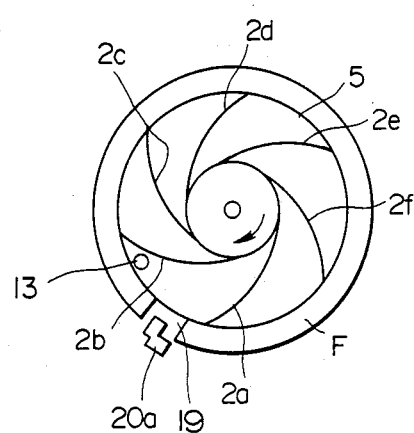
FIGS. 8A, 8B and 8C are plan views showing relationships between the sound grooves of the record disk unit and the selection rods.

The phonograph operates in the following manner: The pickup 13, which has finished the reproduction of one sound groove 2, is positioned at a portion of the reproduction finish point 14, and the finish switch 15 is opened to interrupt the supply of electric power to the motor 3. Here, and as shown in FIGS. 4 and 8A, when a selection rod 20a selected out of the selection rods 20 is pushed, its pressing portion 25 is advanced, and pushes a corresponding one of the slant surfaces 16 of the stylus pressure release actuating wheel 17. As a result, the stylus pressure release actuating wheel 17 rotates counterclockwise, as in FIGS. 5 to 7. Thus, the stylus pressure release member 8 moves in a direction to scoope and raise the sound conducting member 8 to a position shown by the phantom line in FIG. 5B. As a result, the stylus pressure for the pickup 13 is released. Thus, the pickup 13 returns to the reproduction starting point 12 by the elastic force of the return spring 11. The finish switch 15 is no longer supported by the pickup 13, and it is closed to rotate the motor 3.

In this manner, when the selection rod 20a is pushed, the engaging member 24 is pressed against the peripheral edge of the flange F and is elastically deformed. When the selection rod 20a is further pushed, the engaging member 24 at last engages the flange F, as shown in FIG. 6. Accordingly, the pressing portion 25 maintains its support of the slant surface 16 of the stylus pressure release actuating wheel 17 against the elastic force of a spring 27 of the selection rod 20a. Thus, the stylus pressure release actuating wheel 17 is held at its rotated position, and the raised condition of the speaker unit 9 by the stylus release member 18 is maintained.

As described in the foregoing, the finish switch 15 is closed to energize the motor 3, and the record disk unit 5 is rotated in the direction of the arrow in FIG. 8A.

As shown in FIG. 6, when the index portion 19 comes around to the position of the selection rod 20a, the engaging member 24 is permitted to pass through the index portion 19 and to move below the flange F, as in the case of the engaging member (not shown) of the selection rod 20 which is not pushed as shown in FIG. 6. Thus, the pressing portion 25 retreats downwardly, together with the selection rod 20a, by the elastic force of the spring 27. The stylus pressure release actuating wheel 17 loses its support at the slant surface 16, and it is rotated by the elastic force of the spring 33 to return to the original position. The stylus pressure release member 18, also, returns to the original position, together with the stylus pressure release actuating wheel 17, to release the support for the speaker unit 9. Accordingly, the stylus pressure is applied to the pickup 13. In this case, in view of the direction of the record disk 5a, and as shown in FIG. 8A, a reproducing stylus of the pickup 13 engages the sound grooves 2a.

Figure 8B:
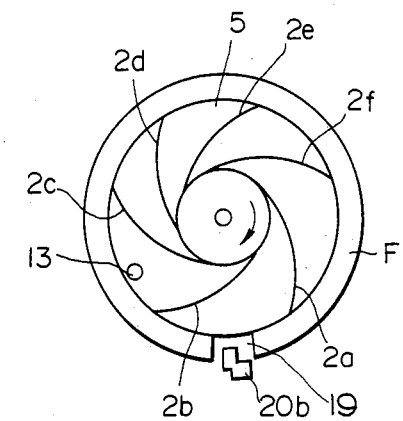
Figure 8C:
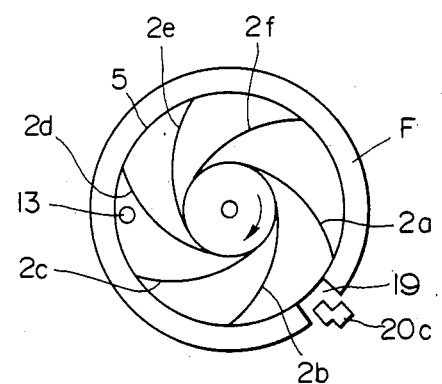

In the case of FIG. 8B, when a selection rod 20b, as one of the selection rods 20, is pushed, a positional relationship is specified so that a sound groove 2b selected out of the sound grooves 2, is allowed to engage the pickup 13. Similarly, in the case of FIG. 8C, a relationship between a selection rod 20c and a sound groove 2c is specified.

As described above, when any desired one of the selection rods 20 is pushed, the engaging member 24 is latched by the flange F, and it is possible to maintain the pushed condition of the selection rod 20.

Accordingly, one the pushed selection rod is latched and the retreat due to the spring 27 is prevented.

Thus, even when a finger which pushes the selection rod 20 is disengaged just after the pushing, the selection rod 20 can be maintained in the pushed condition against the spring 27.

Having, thus, described the invention, what is claimed is:

1. A phonograph comprising:
   a casing;
   a record disk unit having a plurality of sound grooves on a recording surface and rotatably supported in said casing so as to be driven by a motor;
   a speaker unit having a speaker cone and a sound conducting member and being supported on said record disk unit above a recording surface thereof so as to be oscillatable to approach or move away from the recording surface;
   a stylus pressing spring for urging the sound conducting member of said speaker unit toward a recording surface of said record disk unit;
   a pickup sandwiched between the sound conducting member and said record disk unit and being applied with a stylus pressure by said stylus pressing spring, said pickup being urged normally by a return spring in a direction of a reproduction starting point of said record disk unit and in a direction away from a sound recording surface;
   a finish switch for interrupting a supply of electric power to the motor when said pickup reaches a reproduction finish point of said record disk unit and for supplying the electric power to the motor when the pickup returns to the reproduction starting point;
   a stylus pressure release actuating wheel supported rotatably and coaxially with said record disk unit in said casing and constantly urged in a predetermined rotational direction, said stylus pressure release actuating wheel having a number of slant surfaces equal in number with the number of the sound grooves of said record disk unit and rotated against the urging force when one of the slant surfaces is pressed;
   a stylus pressure releasing member formed on said stylus pressure release actuating wheel for raising said record disk unit when said stylus pressure release actuating wheel is rotated against the urging force to release the stylus pressure to thereby allow said pickup to return to the reproduction starting point by said return spring;
   an index portion formed in a periphery of said disk unit;
   a plurality of selection rods corresponding in number to the number of the sound grooves for, respectively, pushing the slant surfaces of said stylus pressure release actuating wheel, so that when said index portion moves to a coincident in a pushed condition with one of said selection rods, said pickup is applied with the stylus pressure at a position at which an introducing portion of a specified one of the sound grooves is engageable with said pickup which has returned to the reproduction starting point; and
   a plurality of spring for, respectively, constantly urging said selection rod in a retreating direction toward the outside of said casing;
   said index portion being formed by a cut out portion of a continuous flange formed along a peripheral edge of said record disk unit;
   each of said plurality of selection rods being formed with an elastic engaging member, so that when said stylus pressure release actuating wheel is rotated by pushing one of said selection rods, said engaging member is elastically deformed to ride over and engage the flange of said record disk unit, and when said index portion comes around to a position coincident with said engaging member, said engaging member is allowed to pass through the cut-out portion of said index portion to return said selection rod to its original position by said spring to thereby apply the stylus pressure to said pickup.

2. A phonograph according to claim 1, wherein said plurality of selection rods are disposed in contact with a peripheral surface of said stylus pressure release actuating wheel, the selection rods being in parallel with one another, and
   said engaging member is integrally formed with a portion of each of said selection rods which portion pushes the slant surface of said stylus pressure release actuating wheel, and said engaging member comprises a downwardly slanting tongue piece.

* * * * *